Aug. 18, 1970  W. E. HENSEL, JR., ET AL  3,524,815
LITHIUM BROMIDE-LITHIUM IODIDE COMPOSITIONS FOR
ABSORPTION REFRIGERATION SYSTEM
Filed Jan. 3, 1968  2 Sheets-Sheet 1
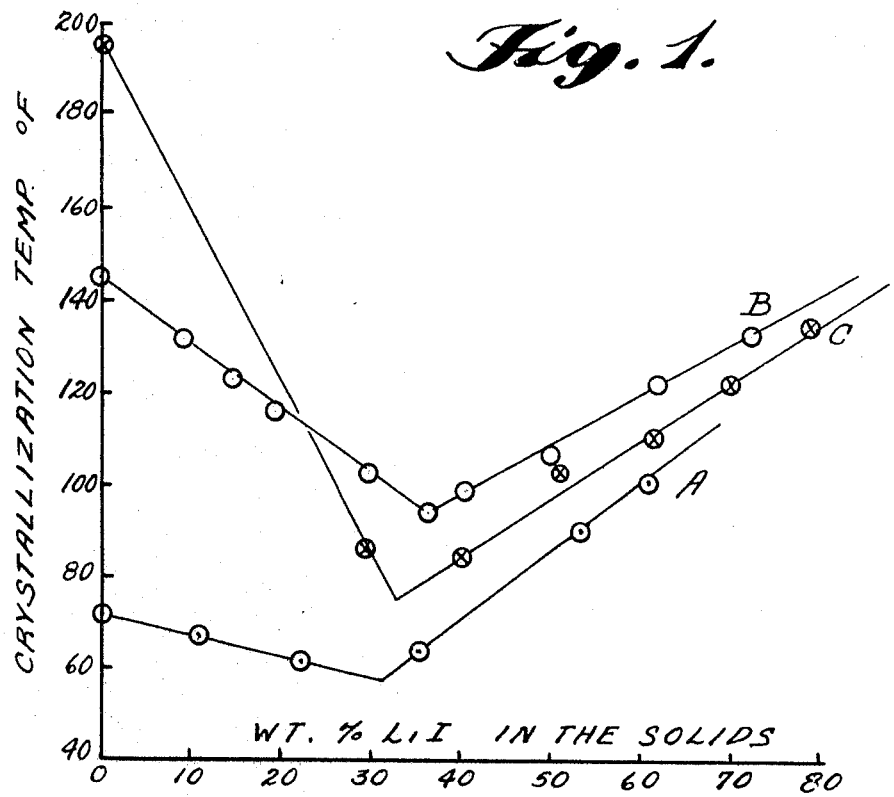
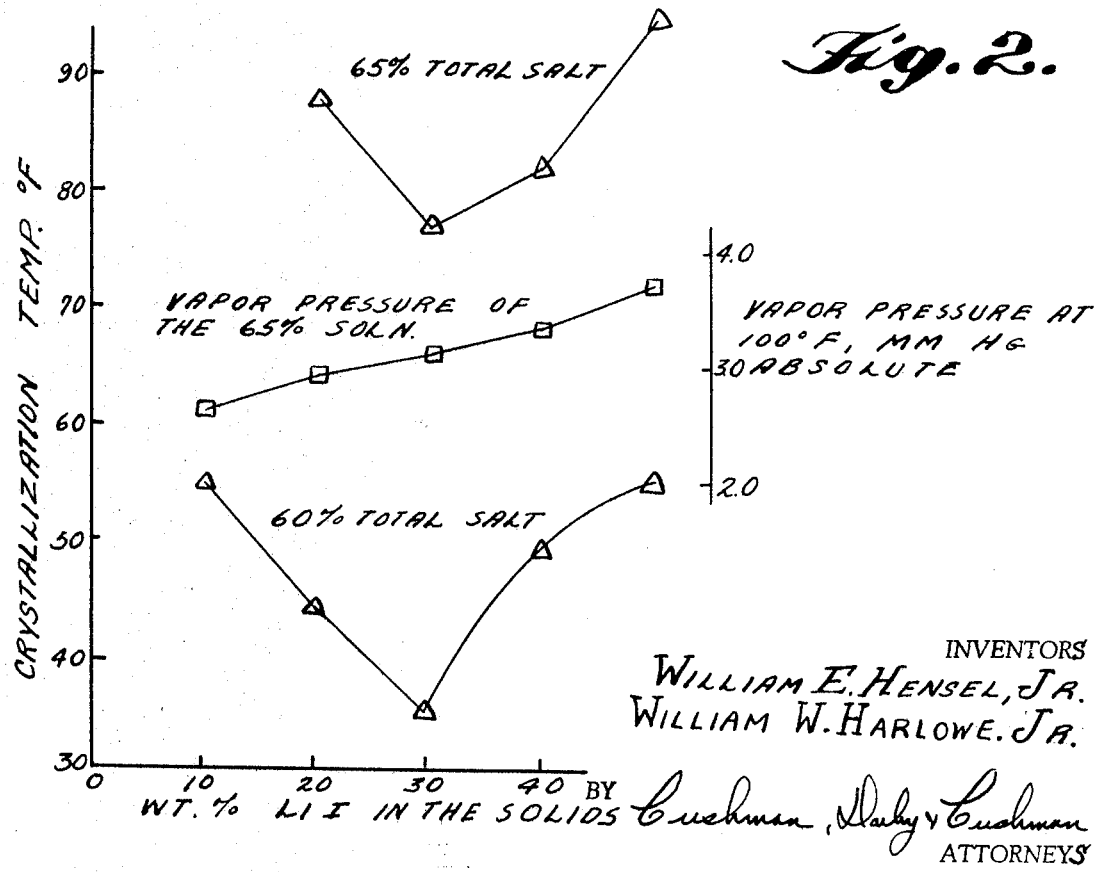
INVENTORS
WILLIAM E. HENSEL, JR.
WILLIAM W. HARLOWE, JR.
BY Cushman, Darby & Cushman
ATTORNEYS

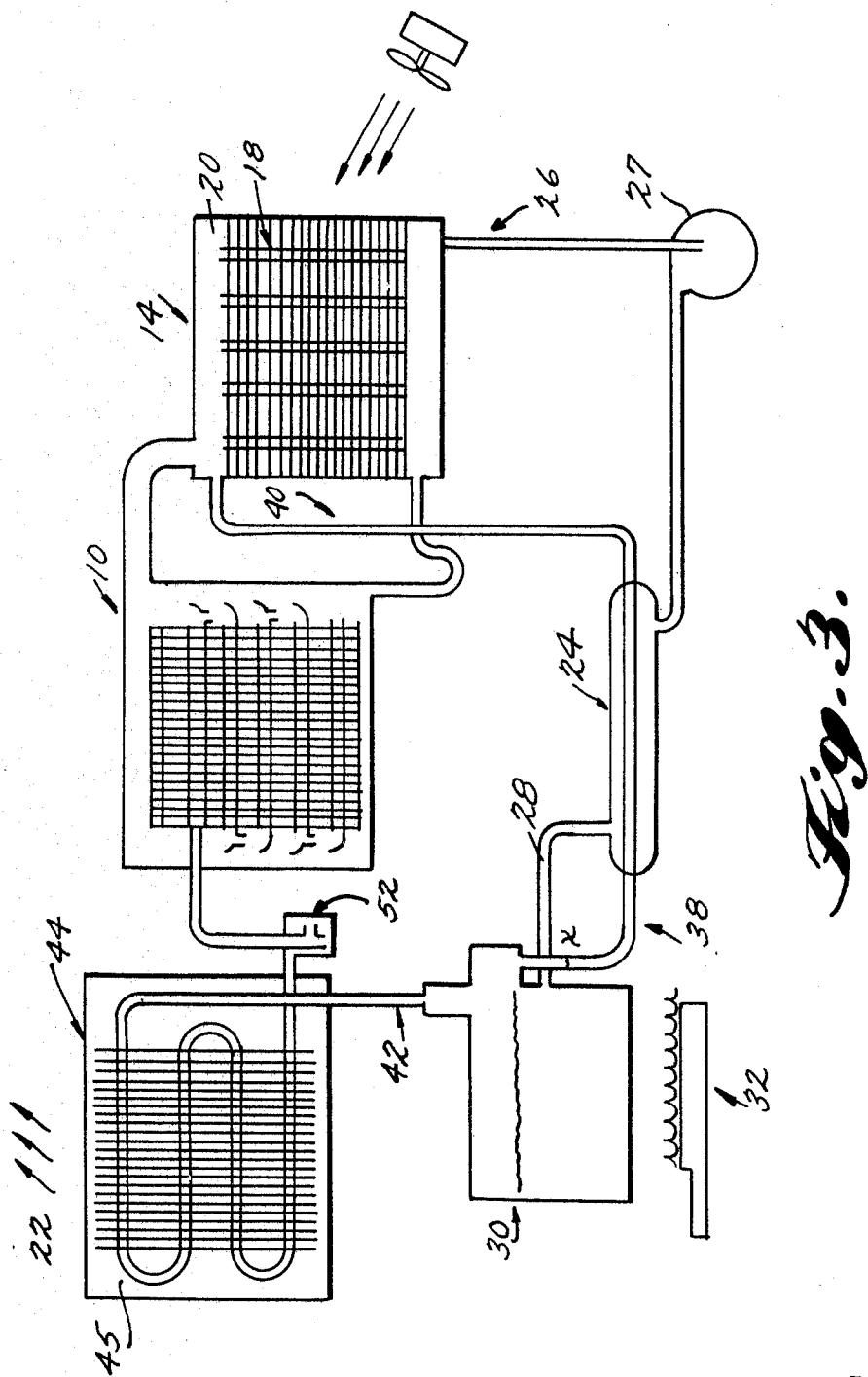

United States Patent Office 3,524,815
Patented Aug. 18, 1970

3,524,815
LITHIUM BROMIDE-LITHIUM IODIDE COMPOSITIONS FOR ABSORPTION REFRIGERATION SYSTEM
William E. Hensel, Jr., Powell, Ohio, and William W. Harlowe, Jr., San Antonio, Tex., assignors, by mesne assignments, to Arkla Industries, Inc., Evansville, Ind., a corporation of Delaware
Filed Jan. 3, 1968, Ser. No. 695,523
Int. Cl. C09k 3/02
U.S. Cl. 252—69   3 Claims

ABSTRACT OF THE DISCLOSURE

Aqueous solutions of LiI-LiBr containing up to about 50 weight percent LiI based on total salt are used as the refrigerant-absorbent in an air-cooled, two-pressure absorption refrigeration system. The crystallization temperatures of these solutions are sufficiently low that crystal formation will not occur when the temperature of the solution drops to ordinarily expected ambient temperatures of, for example, 100° F. Further depression of the crystallization temperature is obtained by adding ethylene glycol or glycerine to the mixed salt solution.

DISCLOSURE

This invention relates to two-pressure absorption refrigeration systems of the type employing an aqueous salt solution as the absorbent-refrigerant and in particular to the use of solutions of special composition having low crystallization temperature, thereby rendering the solutions suitable for use in ambient air-cooled systems.

Refrigeration systems of the general type contemplated by the present invention, often referred to as two-pressure refrigeration systems, comprise a closed circuit containing an aqueous salt solution under high vacuum. Cooling is effected by vaporizing liquid refrigerant (water) within an evaporator coil or the like which forms part of the closed circuit. Air or other fluid medium is passed over the coil and thereby becomes chilled as it provides heat of vaporization to the refrigerant. The resulting refrigerant vapor passes to an absorber section where it is contacted with and absorbed into a stream of liquid absorbent (an aqueous solution of lithium chloride, lithium bromide or the like). Heat liberated by the absorption process is removed by heat exchange with an external cooling medium. The resulting solution which has high refrigerant content passes to a generator section where it is heated by an external heat source to expel refrigerant (water) vapor. The resulting solution (absorbent) which has low refrigerant (water) content returns to the absorber section. The refrigerant (water) vapor is condensed by heat exchange with an external cooling medium and then again passes to the evaporator section.

The operation of a typical absorption circuit depends, among other things, on the reduction of the vapor pressure of the refrigerant (water) as it is absorbed into the absorbent (concentrated salt solution). The low pressure which is produced in the absorber section is, of course, transmitted to the evaporator section and causes the liquid refrigerant to evaporate until its temperature drops to a value at which the refrigerant vapor pressure equals the pressure in the absorber section. That is, the refrigerant temperature varies directly with absorber pressure. It is evident, therefore, that the cooling capacity of the circuit is directly related to absorber pressure, and for this reason it is the practice to employ an absorbent which has a low vapor pressure at the operating temperature of the absorber section.

It is recognized in the art that one way of obtaining a low absorber pressure, and thereby achieving greater cooling capacity, is to employ a more highly concentrated salt solution. On the other hand, it is also recognized that this advantage is offset by the fact that the highly concentrated salt solution has a greater tendency to crystallize, so of course the maximum concentration is limited by the solubility of the salt.

These disadvantages are aggravated in an air-cooled refrigeration system, such as an air-cooled air conditioning unit employed to cool the interior of an enclosure, for two reasons. First, a higher absorber temperature is required for a given evaporator temperature, and this in turn calls for the use of a salt solution having a particularly low vapor pressure, so low that the solubility characteristics of the commonly employed salts preclude obtaining the desired vapor pressure. Second, even if the first problem is overcome by employing a particularly soluble salt, the crystallization temperature of the concentrated solution may be so high that the solution will crystallize when the system is shut down. For example, a solution having a crystallization temperature of 80° F. will not crystallize at the operating temperature, say 130° F. of the system, but after shut down the solution will cool toward ambient temperature which may well be below 80° F.

The present invention is based on the finding that aqueous solutions of LiI-LiBr containing between about 10 weight percent and about 50 weight percent LiI, with an optimum at about 35 weight percent LiI, based on total salt, have a combination of low vapor pressure and low crystallization temperature which renders them admirably suited for use in air-cooled refrigeration systems. Heretofore, LiI-LiBr solutions high in LiI content, that is above 50% LiI, have been suggested for use in such refrigeration systems, apparently because it was believed that the desired low crystallization temperature existed only at high iodide concentrations. It has now been found, however, after careful experimentation, that the optimum minimum crystallization temperature of the LiI-LiBr-H$_2$O system is obtained with the lower iodide concentrations, particularly in the range 30%-40% based on total salt. In addition, it has been observed that the vapor pressure for these lower iodide concentrations is lower than for the higher iodide concentrations, and this is a further reason for selecting the lower concentrations.

The conclusions of the present invention regarding the optimum iodide concentration are based on experiments which directly measured the effect of changes in iodide concentration on crystallization temperature. In particular the experiments measured the crystallization temperature of solutions of different salt concentrations but having the same vapor pressure, because this procedure was found to give more realistic information from the absorbent-refrigerant standpoint. The primary advantage of comparing solutions having the same pressure vapor pressure is that all the solutions have the same refrigerating capacity insofar as this latter characteristic depends on the vapor pressure of the solution. As a result of this the measured crystallization temperatures may be compared directly with each other without resort to conjecture or additional testing regarding the effectiveness of a particular solution as an absorbent-refrigerant.

A second feature of the present invention relates to the discovery that it is possible to further reduce the crystallization temperature of aqueous saline refrigerant-absorbers by incorporating in the solution a polyhydric alcohol such as ethylene glycol or glycerine. This makes possible the use of a more highly concentrated refrigerant-absorber in a refrigeration system, thus taking advantage of the high cooling capacity of such solutions due to their low vapor pressure. The concept is applicable to saline type absorption refrigeration systems in general, but has particular utility with respect to LiI-LiBr solutions, especially the 10–50% LiI (based on total salt) solutions referred to above, because the latter are intended for use in air-cooled systems where concentrated solutions must be employed. The best results are obtained with the more narrow range of 30–40% LiI inasmuch as the minimum crystallization temperature exists in this range.

The selection of a crystallization temperature depressant is not a straightforward or obvious matter, because the solubility relationships in a three or more component system become very complex due to the effect of each solute on the solubilities of the other components. These mutual effects cannot be predicted without experimental data on the particular case under consideration. The crystallization temperature for a given salt-water solution without depressant can, of course, be determined from the phase diagram for that system once the diagram has been developed experimentally. However, the effect of an additional soluble component, particularly an organic component, on the phase diagram does not follow any uniform theory. In this regard it will be appreciated that the formation of salt crystals or hydrate crystals in a solution upon a drop in temperature is related to solubility and does not follow the same concepts as the depression of the freezing point (i.e. formation of ice crystals) of an aqueous solution by adding antifreeze compositions thereto. In the latter case the formation of solids as temperature is reduced is related to the freezing out of solvent and not to the mutual solubilities of the components.

In addition, the depressant should adversely alter the physical properties of the solution, such as viscosity and vapor pressure, as little as possible. It must be non-reactive with the solution and with the equipment and must be heat stable under the operating conditions. All these considerations render the selection of a suitable depressant quite unpredictable.

The invention will be further understood from the following detailed discussion taken with the drawings in which:

FIG. 1 is a graph of crystallization temperature versus composition for several families of different LiI-LiBr solutions, the solutions of each family having the same vapor pressure;

FIG. 2 is a graph of crystallization temperature versus composition for two different families of LiI-LiBr solutions, the solutions of each family having the same total salt concentration; and FIG. 3 is a simplified schematic view of a salt solution type absorption refrigeration system suitable for use in an air cooled air conditioning unit.

FIG. 1 illustrates graphically some of the experimental results which support the conclusion of the present invention that the LiI content of an aqueous LiI-LiBr refrigerant-absorbent should lie between about 10% and about 50%, by weight based on total salt, with an optimum range from about 30% to about 40%. The graph is a plot of crystallization temperature versus LiI concentration for three different families of solutions, and the primary feature to be observed is the fact that certain proportions of LiI to LiBr in mixed salt solutions effect a minimum crystallization temperature which is significantly lower than the crystallization temperature of either a 100% LiI solution or a 100% LiBr solution. More specifically, it will be observed that the curves A, B and C, each of which represents a family of practical refrigerant-absorber solutions, have minimums which are close to each other in terms of LiI concentration, these minimums occurring quite close to 35% LiI. It will be understood, of course, that by crystallization temperature is meant the temperature above which substantially no solid crystals are present.

As described previously, all the solutions of each family in FIG. 1 have the same vapor pressure, although the vapor pressure of each family is different. The solutions of family A have vapor pressures equal to the vapor pressure of an aqueous LiBr solution containing 61.6 weight percent LiBr. The solutions of family B correspond in vapor pressure to a 65 weight percent LiBr solution, and the solutions of family C correspond in vapor pressure to a 68 weight percent LiBr solution. Since 61.6%, 65% and 68% LiBr solutions are typical practical saline solutions for use as refrigerent-absorbents, the solutions of families A, B and C are also practical refrigerant-absorbers, at least insofar as their vapor-pressure characteristics are concerned.

The solutions were made up, broadly, by weighing out the salts in the desired ratios, dissolving in water and then adjusting the total salt concentration by boiling off or adding water until the desired vapor pressure was obtained. For example, the solutions of family B were made up by dissolving the different mixed salts in separate batches of water and then boiling until a boiling point of 339° F. was reached, this boiling point being that of an aqueous 65 weight percent LiBr solution. The solutions of families A and C were adjusted to vapor pressures corresponding to the vapor pressures of aqueous solutions of 61.6% LiBr and 68%, respectively, by a somewhat different procedure involving equilibration at 125° F. and 225° F., respectively. The crystallization temperatures were measured by known techniques and are the temperatures above which crystals do not exit.

Referring more specifically to the shape of the curves plotted from the crystallization temperature data, it will be observed that curve A shows a minimum crystallization temperature of about 58° F. at about 32% LiI, curve B shows a minimum of about 94° F. at about 37% LiI, and curve C shows a minimum of about 76° F. at about 33% LiI. It is not fully understood why the minimum crystallization temperature of curve C is lower than the minimum crystallization temperature of curve B inasmuch as the solutions of family C correspond to solutions of greater vapor pressure than the family B solutions. Since the family B solutions and the family C solutions were not made up in exactly the same manner, it is likely these differences are reflected in the vertical offset of curves B and C. The important features of all three curves is that the lowest crystallization temperature of each family of solutions occurs in the range about 30% LiI to about 40% LiI, with the actual minimums always occurring at about 35% LiI.

It will be appreciated from the above description that each solution in each family has a different total salt concentration, although this value is not known unless it is measured separately or is calculated in some fashion. While the total salt concentration does not vary widely it was thought to be desirable to determine the crystallization points of some constant total salt solutions of varying LiI concentration for comparison purposes. The results of measurements carried out on two families of constant total salt solutions are shown in FIG. 2, and it it immediately apparent that similar minimum crystallization temperatures also exist for these solutions.

More specifically, in FIG. 2 the lower curve shows that for aqueous solutions of LiI-LiBr of constant mixed salt content of 60 weight percent, a minimum crystallization temperature of about 35° F. occurs at about 30% LiI. For aqueous solutions of constant mixed salt content of 65 weight percent, a minimum crystallization temperature of about 77° F. occurs at about 30% LiI. The existence of these minimums confirms the previous conclusions regarding the optimum range of LiI content in a mixed salt solution, although the FIG. 2 curves are not directly comparable to the FIG. 1 curves due to differences in experimental techniques.

Also shown in FIG. 2 is a plot vapor pressure versus composition for the solutions of the upper 65% total salt curve. It will be observed that the vapor pressure of the solutions decreaes with a decrease in LiI content. This supports the conclusions of the present invention that the lower iodide concentrations are preferred, because it is recognized that the lower the vapor pressure the greater is the cooling capacity of the solution.

The cooling system of the closed refrigeration circuit of FIG. 3 is a refrigerant evaporator 10, shown in the form of a finned coil, in which the refrigerant liquid (water) vaporizes under subatmospheric pressure thereby extracting heat from whatever fluid medium surrounds the coil. The resulting water vapor passes into an absorber 14 which is illustrated in the form of a vessel having a tubular heat exchanger core 18 therein. Absorption liquid, for example an aqueous solution of LiI-LiBr containing 35 weight percent LiI based on total salt, flows from a header 20 into the open upper ends of one set of flow channels in the core 18 and presents a large surface area over which absorption of water vapor takes place. Heat liberated by the absorption process is removed by a stream of ambient cooling air 22 which flows through the other set of core channels.

The resulting dilute salt solution flows downwardly by way of line 26, pump 27, heat exchanger 24 and line 28 into a water vapor generator 30. In the generator 30 the dilute salt solution is heated to boiling temperature by means of a gas burner 32 or the like so that water vapor is expelled from the solution.

Concentrated solution flows from the generator 30 through a line 38 to the heat exchanger 24 where it preheats the dilute salt solution before the latter passes to the generator 30. The cooler concentrated solution then flows upwardly through a line 40 to the header 20 in the absorber 14.

The water vapor produced in the generator 30 passes through a line 42 to a condenser 44 which is illustrated in the form of a finned tube 46. The water vapor flows in the tube 46 and is condensed by giving up heat to a stream of cooling air 22 flowing over the outside of the tube 46. The stream of condensed water flows from the condenser 44 through an orifice 52 to the evaporator 10 where it again vaporizes to effect the desired cooling action of the system.

The system requires that pressure difference be maintained between the high pressure and low pressure parts of the system. More specifically, the orifice 52 helps to maintain a pressure differential between the low pressure in the evaporator 10 and the higher pressure in the condenser 44. The solution pump 27 maintains pressure in the rich-in-refrigerant solution line, while a solution column in line 38 as shown at X maintains pressure in the weak-in-refrigerant solution circuit. Alternatively, a float valve could be provided in the line 38.

All of the above description of FIG. 3, with the exception of the composition of the absorbent-refrigerant, is applicable to absorbent refrigeration systems generally and has been given in order that the concepts of the present invention may be presented in their proper environment. A more detailed discussion of the operation of the absorber 14 will aid in clarifying the invention. First, it will be appreciated that a low pressure must be maintained in the absorber 14 in order to reduce the pressure in the evaporator 10 to a value at which the liquid refrigerant (water) will vaporize at a satisfactory temperature. The pressure in the absorber 14 is theoretically the vapor pressure of the solution therein at the temperature of the solution. In an air-cooled absorber 14, using ambient air at for example 90° F., the temperature will be relatively high as compared to the temperature which can be obtained with cooling water, and it follows that the vapor pressure of the solution will be relatively high. In order to effect as low a pressure as possible in an air-cooled system it is necessary to employ a highly concentrated salt solution in order to take advantage of the lower vapor pressure of such a solution. However, as already noted, this introduces a disadvantage in that the concentrated solution may tend to crystallize during a period of shut down when the temperature of the absorber tends to fall toward ambient temperature. That is, the concentrated solution may have a crystallization temperature above ambient temperature in which case crystals will form when the system cools to ambient temperature. During operation, of course, the cooling of the absorber solution is controlled so as to prevent too low a temperature.

As already described, the present invention relieves this disadvantage of concentrated salt solutions by employing an aqueous solution of LiI-LiBr containing 10–50 weight percent LiI based on total salt. The upper and lower limits are determined by extending the LiI content from the optimum of about 35% LiI in both directions to cover useful solutions. Since the vapor pressure increases with an increase in LiI content, the concentration of LiI should not be raised beyond about 50%, because above this the relatively high vapor pressure significantly reduces the cooling capacity of the solution. The lower iodide limit is not affected by vapor pressure considerations and all solutions from the optimum of 35% iodide down to about 10% are useful.

With respect to that part of the invention which relates to the further depression of the crystallization temperature, the following described tests illustrate the depressant effect which can be obtained. More specifically, the tests show that a salt solution which by itself has a relatively high crystallization temperature (for example 95° F.) can be treated so as to have a much lower crystallization temperature (for example 52° F.), thereby rendering the solution usable in an air-cooled system under normally expected adverse ambient temperature conditions.

EXAMPLE

A dry salt mixture containing 63 weight percent lithium bromide and 37 weight percent lithium iodide was dissolved in water to provide a stock solution. Samples 1, 2 and 3 were prepared by mixing weighed quantities of the mixed salt solution and ethylene glycol and concentrating by boiling until their boiling points reached 339° F., the boiling point of an aqueous 65 weight percent LiBr solution. The crystallization temperatures of the stock solution and of the samples were determined. The results appear below.

| Sample | Wt. percent salt | Wt. percent water | Wt. percent glycol | Denisty, g./cc., 130° F. | Viscosity, cp., 130° F. | Crystallizations, temp. °F. | Ratio of organic to salt |
|---|---|---|---|---|---|---|---|
| Stock | | | 0 | | | 95 | 5 |
| 1 | 63.0 | 28.1 | 8.9 | 1.818 | 8.0 | 79 | 0.10 |
| 2 | 61.1 | 25.7 | 13.2 | 1.800 | 11.3 | 67 | 0.214 |
| 3 | 59.0 | 23.9 | 17.1 | 1.752 | 12.5 | 52 | 0.39 |

The above data show that the addition of ethylene glycol to the saline solution reduces the crystallization temperature of the solution a significant amount. More specifically, the data show that the crystallization temperature can be reduced from 95° F. to 52° F. In an environment where an air conditioning unit is operated, ambient temperature during a period when the unit is turned off temporarily may well be below 95°. The addition of the depressant to a solution can, therefore, render effective a normally unsuitable solution.

The drawing and examples have been given by way of illustration, and their details are not intended to be limiting except as they appear in the appended claims.

What is claimed is:

1. A liquid absorbent-refrigerant composition for use in a two-pressure absorption refrigeration system consisting essentially of an aqueous solution of lithium bromide and lithium iodide in which the lithium iodide is present in an amount between about 10% and about 50% by weight based on the weight of total salt.

2. A liquid absorbent-refrigerant composition as in claim 1 wherein the lithium iodide content is between about 30% and about 40% by weight based on total salt.

3. A liquid absorbent-refrigerant composition as in claim 1 containing as a crystallization temperature depressant a polyhydric alcohol selected from the group consisting of ethylene glycol or glycerine in an amount up to about 20% by weight of the solution.

References Cited

UNITED STATES PATENTS 3,296,814   1/1967   Lynch et al. _____ 252—69 X

RICHARD D. LOVERING, Primary Examiner

I. GLUCK, Assistant Examiner

U.S. Cl. X.R.

252—67; 62—112